US011634579B2

(12) United States Patent
Kosaka et al.

(10) Patent No.: US 11,634,579 B2
(45) Date of Patent: Apr. 25, 2023

(54) RESIN COMPOSITION, MOLDED BODY, OPTICAL LAYER, COVER MEMBER AND MOVING BODY

(71) Applicant: SUMITOMO BAKELITE CO., LTD., Tokyo (JP)

(72) Inventors: Tomoya Kosaka, Tokyo (JP); Yuichiro Funakoshi, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 0 days.

(21) Appl. No.: 17/598,980

(22) PCT Filed: Mar. 24, 2020

(86) PCT No.: PCT/JP2020/012969
§ 371 (c)(1),
(2) Date: Sep. 28, 2021

(87) PCT Pub. No.: WO2020/203458
PCT Pub. Date: Oct. 8, 2020

(65) Prior Publication Data
US 2022/0089867 A1   Mar. 24, 2022

(30) Foreign Application Priority Data
Mar. 29, 2019   (JP) .............................. JP2019-069258

(51) Int. Cl.
*C08L 69/00* (2006.01)
*G02B 1/04* (2006.01)
(Continued)

(52) U.S. Cl.
CPC .............. *C08L 69/00* (2013.01); *C08J 7/046* (2020.01); *C08J 7/0427* (2020.01);
(Continued)

(58) Field of Classification Search
CPC ......... C08L 69/00; G02B 1/04; C08K 5/0041; C08K 5/08; C08K 5/3437; C08J 7/046;
(Continued)

(56) References Cited

U.S. PATENT DOCUMENTS

2009/0207496 A1\*   8/2009   Sasaki ..................... C08L 69/00
524/612
2016/0311204 A1   10/2016   Onishi et al.
(Continued)

FOREIGN PATENT DOCUMENTS

EP   3719085 A1   10/2020
JP   9-3311 A   1/1997
(Continued)

OTHER PUBLICATIONS

International Search Report dated Jun. 9, 2020, issued in counterpart International Application No. PCT/JP2020/012969 (2 pages).
(Continued)

*Primary Examiner* — Bijan Ahvazi
(74) *Attorney, Agent, or Firm* — WHDA, LLP

(57) ABSTRACT

A resin composition of the present invention is used in an optical layer 10 provided with a first layer (base material layer 1) including a polycarbonate-based resin and a visible light absorber for forming the first layer. The visible light absorber includes a plurality of kinds of light absorbers, and a melting point of a first light absorber having the lowest melting point is equal to or higher than 200° C., in which a melting point of a second light absorber having the highest melting point is equal to or lower than 330° C. The resin composition is such that the viscosity at 260° C. obtainable when a shear rate is 243.2 [1/sec] is equal to or more than 400 Pa·s and equal to or less than 3500 Pa·s.

14 Claims, 1 Drawing Sheet

(51) Int. Cl.
*C08K 5/00* (2006.01)
*C08J 7/04* (2020.01)
*C08J 7/046* (2020.01)
*C08K 5/08* (2006.01)
*C08K 5/3437* (2006.01)

(52) U.S. Cl.
CPC .............. *C08K 5/0041* (2013.01); *C08K 5/08* (2013.01); *C08K 5/3437* (2013.01); *G02B 1/04* (2013.01); *C08J 2369/00* (2013.01); *C08J 2475/16* (2013.01)

(58) Field of Classification Search
CPC ... C08J 7/0427; C08J 2369/00; C08J 2475/16
See application file for complete search history.

(56) References Cited

U.S. PATENT DOCUMENTS

2018/0003871 A1* 1/2018 Sawada ................ C08K 5/3447
2018/0056635 A1  3/2018 van Heerbeek et al.

FOREIGN PATENT DOCUMENTS

| | | | |
|---|---|---|---|
| JP | 2000-53829 A | 2/2000 | |
| JP | 2000-327893 A | 11/2000 | |
| JP | 2002-138209 A | 5/2002 | |
| JP | 2005-298615 A | 10/2005 | |
| JP | 2012-219169 A | 11/2012 | |
| JP | 2013-227562 A | 11/2013 | |
| JP | 2013227562 A * | 11/2013 | ............... C08J 5/00 |
| JP | 2014-51551 A | 3/2014 | |
| JP | 2018-109734 A | 7/2018 | |
| JP | 2018-109742 A | 7/2018 | |
| WO | 2015/093516 A1 | 6/2015 | |

OTHER PUBLICATIONS

Decision to Grant a Patent dated Jan. 7, 2020, issued in counterpart JP Patent Application No. 2019-069258, w/ English translation (5 pages).

* cited by examiner

RESIN COMPOSITION, MOLDED BODY, OPTICAL LAYER, COVER MEMBER AND MOVING BODY

TECHNICAL FIELD

The present invention relates to a resin composition used for forming an optical layer, a molded body, an optical layer, a cover member, and a moving body.

BACKGROUND ART

Generally, a molded body molded using a resin composition containing a resin material having transmitting properties as a main material, is lightweight and has excellent moldability. Particularly, a molded body containing a polycarbonate-based resin as a main material has satisfactory transparency and has excellent impact resistance compared to glass products. Therefore, such molded bodies are often used for various lamp lenses, window materials, covers for measuring instruments, windshield boards, and the like.

In recent years, such molded bodies have been applied to cover members that cover various sensors and cameras in moving bodies such as automobiles or two-wheeled vehicles. In this case, for the purpose of selectively transmitting light having a wavelength in a specific wavelength range such as the near-infrared region, there has been proposed an optical layer (molded body), to which a light absorber having light absorption characteristics of allowing the transmission of light having a wavelength in the specific wavelength range and being capable of reducing the transmission of light having a wavelength in another specific wavelength range, has been added (see, for example, PTL 1).

However, when an optical layer is formed by adding a light absorber having a high melting point to the resin composition to form an optical layer, there is a problem that the external appearance of the optical layer, that is, the cover member, thus obtained is impaired because this light absorber cannot be uniformly dissolved and dispersed in the resin composition.

CITATION LIST

Patent Literature

[PTL 1] Japanese Unexamined Patent Publication No. 2013-227562

SUMMARY OF INVENTION

Technical Problem

An object of the present invention is to provide a resin composition that can form a first layer to be included in an optical layer, the first layer having excellent external appearance, even if the resin composition includes a light absorber having a high melting point; a molded body formed by using such a resin composition, an optical layer and a cover member, and a moving body having excellent reliability, which is provided with the cover member.

Solution to Problem

Such an object is achieved by the present invention described in the following items (1) to (15).

(1) A resin composition used for forming a first layer of an optical layer, the first layer including a polycarbonate-based resin as a main material and a visible light absorber for absorbing visible light, and the resin composition including the polycarbonate-based resin and the visible light absorber, in which the visible light absorber includes a plurality of kinds of light absorbers, in which among the light absorbers, each of which has a content of equal to or more than 0.005 wt % in the resin composition, when a light absorber having a lowest melting point is denoted as a first light absorber and a light absorber having a highest melting point is denoted as a second light absorber, the melting point of the first light absorber is equal to or higher than 200° C., and the melting point of the second light absorber is equal to or lower than 330° C., and in which when a shear rate for the resin composition is 243.2 [1/sec], a viscosity at 260° C. of the resin composition is equal to or more than 400 Pa·s and equal to or less than 3500 Pa·s.

(2) The resin composition according to (1), in which when a viscosity of the resin composition measured at a shear rate of 12.16 [1/s] at 260° C. is denoted by $\eta 1$, and a viscosity measured at a shear rate of 2432 [1/s] at 260° C. is denoted by $\eta 5$, the resin composition has a thixotropic index, which is a viscosity ratio ($\eta 1/\eta 5$), of equal to or more than 5.0 and equal to or less than 15.0.

(3) The resin composition according to (1) or (2), in which the polycarbonate-based resin has a weight-average molecular weight of equal to or more than $1.2 \times 10^4$ and equal to or less than $3.5 \times 10^4$.

(4) The resin composition according to any one of (1) to (3), in which when a weight-average molecular weight of the polycarbonate-based resin is denoted by Mw and a number-average molecular weight of the polycarbonate-based resin is denoted by Mn, Mw/Mn is equal to or more than 1.0 and equal to or less than 2.0.

(5) The resin composition according to any one of (1) to (4), in which a content of the first light absorber in the resin composition is equal to or more than 0.005 wt % and equal to or less than 0.200 wt %.

(6) The resin composition according to any one of (1) to (5), in which the first light absorber absorbs light in a wavelength range of equal to or more than 360 nm and equal to or less than 500 nm.

(7) The resin composition according to any one of (1) to (6), in which a content of the second light absorber in the resin composition is equal to or more than 0.005 wt % and equal to or less than 0.200 wt %.

(8) The resin composition according to any one of (1) to (7), in which the second light absorber absorbs light in a wavelength range of equal to or more than 680 nm and equal to or less than 800 nm.

(9) The resin composition according to any one of (1) to (8), in which the visible light absorber further contains a third light absorber for absorbing light in a wavelength range of equal to or more than 450 nm and equal to or less than 580 nm, a fourth light absorber for absorbing light in a wavelength range of equal to or more than 500 nm and equal to or less than 660 nm, and a fifth light absorber for absorbing light in a wavelength range of equal to or more than 600 nm and equal to or less than 720 nm, each of which has a melting point of equal to or higher than the lowest melting point and equal to or lower than the highest melting point.

(10) A molded body used for forming the first layer, the molded body being molded using the resin composition according to any one of (1) to (9).

(11) An optical layer including the first layer formed by using the resin composition according to any one of (1) to (9) or the molded body according to (10).

(12) The optical layer according to (11), in which the optical layer further includes a second layer that protects the first layer.

(13) The optical layer according to (11) or (12), in which the optical layer is used as a cover member having a light-transmitting property to block visible light and allow transmission of near-infrared light.

(14) A cover member provided on a moving body and having a light-transmitting property to block visible light and allow transmission of near-infrared light, in which the cover member includes the optical layer according to any one of (11) to (13).

(15) A moving body including the cover member according to (14).

Advantageous Effects of Invention

The resin composition of the present invention is used to form a first layer in an optical layer provided with a first layer that includes a polycarbonate-based resin as a main material; and a visible light absorber absorbing visible light.

In the present invention, such a resin composition contains the polycarbonate-based resin and the visible light absorber; the visible light absorber includes a plurality of kinds of light absorbers; among the light absorbers, the contents of which in this resin composition are each equal to or more than 0.005 wt %, when a light absorber having the lowest melting point is denoted as a first light absorber and a light absorber having the highest melting point is denoted as a second light absorber, the melting point of the first light absorber is equal to or higher than 200° C., the melting point of the second light absorber is equal to or lower than 330° C.; and the viscosity of the resin composition at 260° C. is equal to or more than 400 Pa·s and equal to or less than 3500 Pa·s when the shear rate is set to 243 [1/sec]. Therefore, even if the first light absorber and the second light absorber having melting points such as described above, that is, visible light absorbers having high melting points, are included as visible light absorbers in the resin composition, these visible light absorbers can be dissolved and dispersed in the resin composition with excellent solubility and dispersibility. Therefore, a first layer to be included in the optical layer as a cover member, and a molded body, the first layer and the molded body having been formed by using such a resin composition, can have excellent external appearance.

Therefore, an optical layer and a cover member provided with such a first layer can also have excellent external appearance, and a moving body provided with such an optical layer can have excellent reliability.

DESCRIPTION OF EMBODIMENTS

Hereinafter, the resin composition, the molded body, the optical layer, the cover member, and the moving body of the present invention will be described in detail based on suitable embodiments illustrated in the attached drawings.

The resin composition of the present invention is used for forming a first layer in an optical layer provided with a first layer containing a polycarbonate-based resin as a main material and a visible light absorber absorbing visible light, and includes the polycarbonate-based resin and the visible light absorber. Here, the visible light absorber includes a plurality of kinds of light absorbers; among the light absorbers, the contents of which in the resin composition are each equal to or more than 0.005 wt %, when a light absorber having the lowest melting point is denoted as a first light absorber and a light absorber having the highest melting point is denoted as a second light absorber, the melting point of the first light absorber is equal to or higher than 200° C. and the melting point of the second light absorber is equal to or lower than 330° C.; and the resin composition has a feature that the viscosity at 260° C. obtainable when the shear rate is 243.2 [1/sec] is equal to or more than 400 Pa·s and equal to or less than 3500 Pa·s.

As described above, even if the first light absorber and the second light absorber, that is, visible light absorbers having high melting points, are included in the resin composition as visible light absorbers, since the viscosity at 260° C. is set to be within the above-described range, these visible light absorbers can be dissolved and dispersed in the resin composition with excellent solubility and dispersibility. Therefore, a first layer that is included in an optical layer as a cover member can be formed so as to have an excellent external appearance, by using such a resin composition.

In the following description, before describing the resin composition, the molded body, the cover member, and the moving body of the present invention, the optical layer of the present invention will be described first.

<Optical Layer>

First Embodiment

First, a first embodiment of the optical layer of the present invention will be described.

Figure 1:
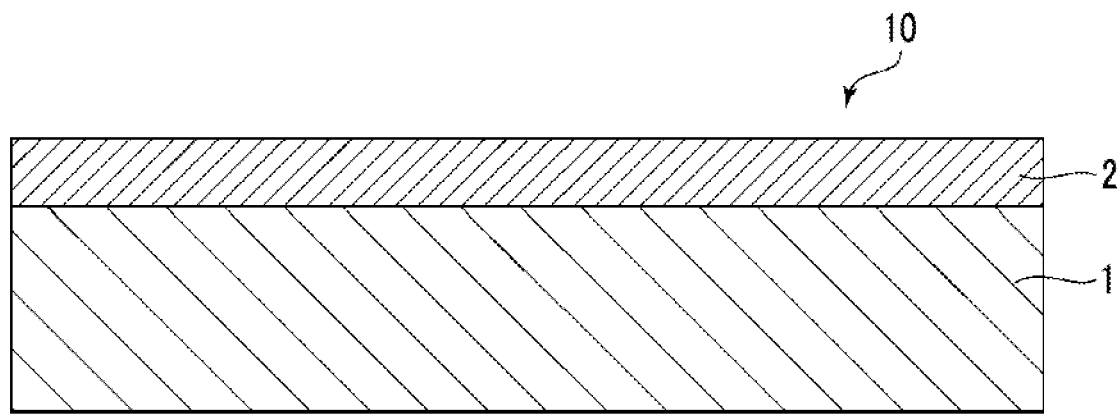
FIG. 1 is a vertical cross-sectional view illustrating a first embodiment of an optical layer of the present invention.

FIG. 1 is a vertical cross-sectional view illustrating the first embodiment of the optical layer of the present invention. Hereinafter, for the convenience of description, the upper side and the lower side in FIG. 1 will be described as "top" and "bottom", respectively.

The optical layer 10 (optical film) is applied to cover members or the like that cover various sensors and cameras. According to the present embodiment, as shown in FIG. 1, the optical layer 10 has a base material layer 1 (first layer) and a protective layer 2 (second layer) that is laminated on the base material layer 1 and protects the base material layer 1.

When the optical layer 10 is applied to a cover member, the optical layer 10 is installed such that the protective layer 2 faces the side facing outside, and the base material layer 1 is on the side of the object material to be covered. As a result, it is possible to make the protective layer 2 (hard coat layer) function as a protective layer that protects the base material layer 1.

The base material layer 1 (first layer) is a molded body (molded body of the present invention) molded into a layer form using a resin composition for forming a base material layer (resin composition of the present invention) including a polycarbonate-based resin as a main material having light-transmitting properties and a visible light absorber that is dissolved and dispersed in this polycarbonate-based resin and absorbs visible light. As the resin composition for forming a base material layer contains a visible light absorber, the base material layer 1 (first layer) has a function of accurately suppressing or preventing the transmission of visible light in a specific wavelength range and thereby allowing transmission of light having a desired wavelength range.

When the optical layer 10 includes such a base material layer 1, the optical layer 10 (cover member) exhibits light-blocking properties that block light in a specific wavelength range and thus exhibits light-transmitting properties of transmitting light having a desired wavelength range. Accordingly, the optical layer 10 can be used as a cover member that allows transmission of light having a desired color tone.

The polycarbonate-based resin is included as a main material (base resin) of the base material layer 1 and contributes to molding of the base material layer 1 into a substrate shape.

This polycarbonate-based resin is rich in transparency (light-transmitting properties) and mechanical strength such as rigidity and impact resistance. Therefore, by using a polycarbonate-based resin as a main material of the base material layer 1, transparency and mechanical strength of the optical layer 10 can be enhanced. Furthermore, since a polycarbonate-based resin has a specific gravity of about 1.2 and is classified as a light resin material among known resin materials, weight reduction of the optical layer 10 can be attempted.

There are various kinds of this polycarbonate-based resin, and those can be used. Examples include a bisphenol-type polycarbonate-based resin as well as an isosorbide-derived polycarbonate-based resin produced using a plant-derived isosorbide as a main material. Among these, a bisphenol-type polycarbonate-based resin is preferred. The bisphenol-type polycarbonate-based resin has a benzene ring on the main chain thereof, and as a result, the strength of the optical layer 10 can be further enhanced.

This bisphenol-type polycarbonate-based resin is synthesized by, for example, an interfacial polycondensation reaction between bisphenol and phosgene, an ester exchange reaction between bisphenol and diphenyl carbonate, or the like.

Regarding the bisphenol, for example, bisphenol A, a bisphenol (modified bisphenol) that serves as an origin of a repeating unit of polycarbonate represented by the following Formula (A), or the like may be mentioned.

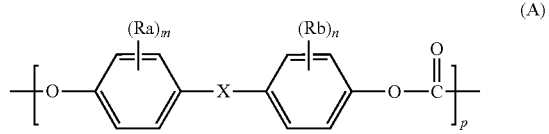

(A)

In Formula (A), X represents an alkyl group having 1 to 18 carbon atoms, an aromatic group, or a cyclic aliphatic group; Ra and Rb each independently represent an alkyl group having 1 to 12 carbon atoms; m and n each independently represent an integer of 0 to 4; and p represents the number of repeating units.

Examples of the bisphenol that serves as the origin of a repeating unit of polycarbonate represented by Formula (A) include 4,4'-(pentane-2,2-diyl)diphenol, 4,4'-(pentane-3,3-diyl)diphenol, 4,4'-(butane-2,2-diyl)diphenol, 1,1'-(cyclohexanediyl)diphenol, 2-cyclohexyl-1,4-bis(4-hydroxyphenyl)benzene, 2,3-biscyclohexyl-1,4-bis(4-hydroxyphenyl)benzene, 1,1'-bis(4-hydroxy-3-methylphenyl)cyclohexane, and 2,2'-bis(4-hydroxy-3-methylphenyl)propane, and these can be used singly or in combination of two or more kinds thereof.

The content of the polycarbonate-based resin in the optical layer 10 is not particularly limited; however, the content is preferably equal to or more than 75 wt %, and more preferably equal to or more than 85 wt %. By setting the content of the polycarbonate-based resin to be within the above-described range, an optical layer 10 exhibiting excellent strength can be obtained.

A visible light absorber suppresses or prevents the transmission of visible light in a specific wavelength range. When a visible light absorber is substantially uniformly included in the base material layer 1 in a state of being dissolved and dispersed therein, a function of allowing transmission of light having a desired wavelength range is given to the base material layer 1.

Such a visible light absorber is not particularly limited; however, according to the present embodiment, examples thereof include a first light absorber absorbing a light having a wavelength of equal to or more than 360 nm and equal to or less than 500 nm, a third light absorber absorbing a light having a wavelength of equal to or more than 450 nm and equal to or less than 580 nm, a fourth light absorber absorbing a light having a wavelength of equal to or more than 500 nm and equal to or less than 660 nm, a fifth light absorber absorbing a light having a wavelength of equal to or more than 600 nm and equal to or less than 720 nm, and a second light absorber absorbing a light having a wavelength of equal to or more than 680 nm and equal to or less than 800 nm, and by appropriately setting the content of each light absorber in combinations of these, the function of allowing transmission of light having a desired wavelength range can be reliably given to the base material layer 1. Accordingly, the optical layer 10 (cover member) exhibits light-transmitting properties of transmitting light having a desired wavelength range. More specifically, in the present embodiment, by setting each of the contents of the first light absorber to the fifth light absorber to be equal to or more than 0.005 wt %, the optical layer 10 exhibits light-transmitting properties of blocking light having a wavelength of equal to or more than 360 nm and equal to or less than 800 nm, that is, visible light, by absorbing the light and allowing transmission of infrared radiation.

The first light absorber has absorption wavelength characteristics of absorbing a light having a wavelength equal to or more than 360 nm and equal to or less than 500 nm. Specifically, this first light absorber may be a quinoline-based coloring matter.

Examples of this quinoline-based coloring matter include 2-methylquinoline, 3-methylquinoline, 4-methylquinoline, 6-methylquinoline, 7-methylquinoline, 8-methylquinoline, 6-isopropylquinoline, 2,4-dimethylquinoline, 2,6-dimethylquinoline, or 4,6,8-trimethylquinoline, 2-aminoquinoline, 3-aminoquinoline, 5-aminoquinoline, 6-aminoquinoline, 8-aminoquinoline, 6-amino-2-methylquinoline, 6-methoxy-2-methylquinoline or 6,8-dimethoxy-4-methylquinoline, 6-chloroquinoline, 4,7-dichloroquinoline, 3-bromoquinoline, and 7-chloro-2-methylquinoline, and these can be used singly or in combination of two or more kinds thereof.

When such a first light absorber is mixed in as a visible light absorber, among the lights incident to the base material layer 1, a light having a wavelength equal to or more than 360 nm and equal to or less than 500 nm can be reliably absorbed in the base material layer 1.

Regarding such a first light absorber, that is, a quinoline-based coloring matter, in the present invention, a light absorber having a melting point equal to or higher than 200° C. is selected from among the above-mentioned examples. In the present embodiment, this first light absorber is a light absorber having a melting point in the range of equal to or higher than 200° C. and equal to or lower than 330° C. and having the lowest melting point among the first to fifth light absorbers. The melting point of the first light absorber is preferably in the range of equal to or higher than 240° C. and equal to or lower than 320° C.

Furthermore, in the present embodiment, the content percentage of the first light absorber in the base material layer 1 may be equal to or more than 0.005 wt %; however, the content percentage is preferably equal to or more than 0.005 wt % and equal to or less than 0.200 wt %, and more preferably equal to or more than 0.008 wt % and equal to or less than 0.150 wt %. When the content percentage of the first light absorber in the base material layer 1 is less than the above-described lower limit value, depending on the type of the first light absorber, there is a risk that the visible light (light having a wavelength equal to or more than 360 nm and equal to or less than 500 nm) absorption property of the base material layer 1 may be deteriorated. Furthermore, even if the content percentage of the first light absorber in the base material layer 1 is more than the above-described upper limit value, further enhancement of the visible light (light having a wavelength equal to or more than 360 nm and equal to or less than 500 nm) absorption property is not observed, and there is a risk that the adhesiveness of the base material layer 1 to the protective layer 2 may be impaired.

The third light absorber has absorption wavelength characteristics of absorbing a light having a wavelength equal to or more than 450 nm and equal to or less than 580 nm. Specifically, this third light absorber may be a perinone-based coloring matter.

Examples of this perinone-based coloring matter include 2,3-naphthaloperinone, 1,8-naphthaloperinone, and tetrabromo-1,2-naphthaloperinone, and these can be used singly or in combination of two or more kinds thereof.

When such a perinone-based coloring matter is mixed in, among the lights incident to the base material layer 1, a light having a wavelength equal to or more than 450 nm and equal to or less than 580 nm can be reliably absorbed in the base material layer 1.

Regarding such a third light absorber, that is, a perinone-based coloring matter, in the present embodiment, a light absorber having a melting point in the range of equal to or higher than 200° C. and equal to or lower than 330° C. is selected from among the above-mentioned examples. That is, in the present embodiment, this third light absorber is a light absorber having a melting point that is the same as or higher than that of the first light absorber and having a melting point that is the same as or lower than that of the second light absorber.

In the present embodiment, the content percentage of the third light absorber in the base material layer 1 may be equal to or more than 0.005 wt %; however, the content percentage is preferably equal to or more than 0.005 wt % and equal to or less than 0.200 wt %, and more preferably equal to or more than 0.008 wt % and equal to or less than 0.150 wt %. When the content percentage of the third light absorber in the base material layer 1 is less than the above-described lower limit value, depending on the type of the third light absorber, the visible light (light having a wavelength equal to or more than 450 nm and equal to or less than 580 nm) absorption property of the base material layer 1 may be deteriorated. Furthermore, even if the content percentage of the third light absorber in the base material layer 1 is more than the above-described upper limit value, further enhancement of the visible light (light having a wavelength equal to or more than 450 nm and equal to or less than 580 nm) absorption property is not observed, and there is a risk that the adhesiveness of the base material layer 1 to the protective layer 2 may be impaired.

The fourth light absorber has absorption wavelength characteristics of absorbing a light having a wavelength equal to or more than 500 nm and equal to or less than 660 nm. Specifically, this fourth light absorber may be an anthraquinone-based coloring matter.

Examples of this anthraquinone-based coloring matter include (1) 2-anilino-1,3,4-trifluoroanthraquinone, (2) 2-(o-ethoxycarbonylanilino)-1,3,4-trifluoroanthraquinone, (3) 2-(p-ethoxycarbonylanilino)-1,3,4-trifluoroanthraquinone, (4) 2-(m-ethoxycarbonylanilino)-1,3,4-trifluoroanthraquinone, (5) 2-(o-cyanoanilino)-1,3,4-trifluoroanthraquinone, (6) 2-(p-cyanoanilino)-1,3,4-trifluoroanthraquinone, (7) 2-(m-cyanoanilino)-1,3,4-trifluoroanthraquinone, (8) 2-(o-nitroanilino)-1,3,4-trifluoroanthraquinone, (9) 2-(p-nitroanilino)-1,3,4-trifluoroanthraquinone, (10) 2-(m-nitroanilino)-1,3,4-trifluoroanthraquinone, (11) 2-(p-tertiary-butylanilino)-1,3,4-trifluoroanthraquinone, (12) 2-(o-methoxyanilino)-1,3,4-trifluoroanthraquinone, (13) 2-(2,6-diisopropylanilino)-1,3,4-trifluoroanthraquinone, (14) 2-(2,6-dichloroanilino)-1,3,4-trifluoroanthraquinone, (15) 2-(2,6-difluoroanilino)-1,3,4-trifluoroanthraquinone, (16) 2-(3,4-dicyanoanilino)-1,3,4-trifluoroanthraquinone, (17) 2-(2,4,6-trichloroanilino)-1,3,4-trifluoroanthraquinone, (18) 2-(2,3,5,6-tetrachloroanilino)-1,3,4-trifluoroanthraquinone, (19) 2-(2,3,5,6-tetrafluoroanilino)-1,3,4-trifluoroanthraquinone, (20) 3-(2,3,4,5-tetrafluoroanilino)-2-butoxy-1,4-difluoroanthraquinone, (21) 3-(4-cyano-3-chloroanilino)-2-octyloxy-1,4-difluoroanthraquinone, (22) 3-(3,4-dicyanoanilino)-2-hexyloxy-1,4-difluoroanthraquinone, (23) 3-(4-cyano-3-chloroanilino)-1,2-dibutoxy-4-fluoroanthraquinone, (24) 3-(p-cyanoanilino)-2-phenoxy-1,4-difluoroanthraquinone, (25) 3-(p-cyanoanilino)-2-(2,6-diethylphenoxy)-1,4-difluoroanthraquinone, (26) 3-(2,6-dichloroanilino)-2-(2,6-dichlorophenoxy)-1,4-difluoroanthraquinone, (27) 3-(2,3,5,6-tetrachloroanilino)-2-(2,6-dimethoxyphenoxy)-1,4-difluoroanthraquinone, (28) 2,3-dianilino-1,4-difluoroanthraquinone, (29) 2,3-bis(p-tertiary-butylanilino)-1,4-difluoroanthraquinone, (30) 2,3-bis(p-methoxyanilino)-1,4-difluoroanthraquinone, (31) 2,3-bis(2-methoxy-6-methylanilino)-1,4-difluoroanthraquinone, (32) 2,3-bis(2,6-diisopropylanilino)-1,4-difluoroanthraquinone, (33) 2,3-bis(2,4,6-trichloroanilino)-1,4-difluoroanthraquinone, (34) 2,3-bis(2,3,5,6-tetrachloroanilino)-1,4-difluoroanthraquinone, (35) 2,3-bis(2,3,5,6-tetrafluoroanilino)-1,4-difluoroanthraquinone, (36) 2,3-bis(p-cyanoanilino)-1-methoxyethoxy-4-fluoroanthraquinone, (37) 2-(2,6-dichloroanilino)-1,3,4-trichloroanthraquinone, (38) 2-(2,3,5,6-tetrafluoroanilino)-1,3,4-trichloroanthraquinone, (39) 3-(2,6-dichloroanilino)-2-(2,6-dichlorophenoxy)-1,4-dichloroanthraquinone, (40) 2-(2,6-dichloroanilino)anthraquinone, (41) 2-(2,3,5,6-tetrafluoroanilino)anthraquinone, (42) 3-(2,6-dichloroanilino)-2-(2,6-dichlorophenoxy)anthraquinone, (43) 2,3-bis(2-methoxy-6-methylanilino)-1,4-dichloroanthraquinone, (44) 2,3-bis(2,6-diisopropylanilino)anthraquinone, (45) 2-butylamino-1,3,4-trifluoroanthraquinone, (46) 1,4-bis(n-butylamino)-2,3-difluoroanthraquinone, (47) 1,4-bis(n-octylamino)-2,3-difluoroanthraquinone, (48) 1,4-bis(hydroxyethylamino)-2,3-difluoroanthraquinone, (49) 1,4-bis(cyclohexylamino)-2,3-difluoroanthraquinone, (50) 1,4-bis(cyclohexylamino)-2-octyloxy-3-fluoroanthraquinone, (51) 1,2,4-tris(2,4-dimethoxyphenoxy-3-fluoroanthraquinone, (52) 2,3-bis(phenylthio)-1-phenoxy-4-fluoroanthraquinone, and (53) 1,2,3,4-tetra(p-methoxyphenoxy)-anthraquinone, and these can be used singly or in combination of two or more kinds thereof.

When such a fourth light absorber is mixed in as a visible light absorber, among the lights incident to the base material layer 1, a light having a wavelength equal to or more than 500 nm and equal to or less than 660 nm can be reliably absorbed in the base material layer 1.

Regarding such a fourth light absorber, that is, an anthraquinone-based coloring matter having absorption wavelength characteristics of absorbing a light having a wavelength equal to or more than 500 nm and equal to or less than 660 nm, in the present embodiment, a light absorber having a melting point in the range of equal to or higher than 200° C. and equal to or lower than 330° C. is selected from among the above-mentioned examples. That is, in the present embodiment, this fourth light absorber is a light absorber having a melting point that is the same as or higher than that of the first light absorber and having a melting point that is the same as or lower than that of the second light absorber.

In the present embodiment, the content percentage of the fourth light absorber in the base material layer 1 may be equal to or more than 0.005 wt %; however, the content percentage is preferably equal to or more than 0.005 wt % and equal to or less than 0.200 wt %, and more preferably equal to or more than 0.008 wt % and equal to or less than 0.150 wt %. When the content percentage of the fourth light absorber in the base material layer 1 is less than the above-described lower limit value, depending on the type of the fourth light absorber, the visible light (light having a wavelength equal to or more than 500 nm and equal to or less than 660 nm) absorption property of the base material layer 1 may be deteriorated. In addition, even if the content percentage of the fourth light absorber in the base material layer 1 is more than the above-described upper limit value, further enhancement of the visible light (light having a wavelength equal to or more than 500 nm and equal to or less than 660 nm) absorption property is not observed, and the adhesiveness of the base material layer 1 to the protective layer 2 may be impaired.

The fifth light absorber has absorption wavelength characteristics of absorbing a light having a wavelength equal to or more than 600 nm and equal to or less than 720 nm. Specifically, this fifth light absorber may be an anthraquinone-based coloring matter.

Examples of this anthraquinone-based coloring matter include (1) 2-anilino-1,3,4-trifluoroanthraquinone, (2) 2-(o-ethoxycarbonylanilino)-1,3,4-trifluoroanthraquinone, (3) 2-(p-ethoxycarbonylanilino)-1,3,4-trifluoroanthraquinone, (4) 2-(m-ethoxycarbonylanilino))-1,3,4-trifluoroanthraquinone, (5) 2-(o-cyanoanilino)-1,3,4-trifluoroanthraquinone, (6) 2-(p-cyanoanilino)-1,3,4-trifluoroanthraquinone, (7) 2-(m-cyanoanilino)-1,3,4-trifluoroanthraquinone, (8) 2-(o-nitroanilino)-1,3,4-trifluoroanthraquinone, (9) 2-(p-nitroanilino)-1,3,4-trifluoroanthraquinone, (10) 2-(m-nitroanilino)-1,3,4-trifluoroanthraquinone, (11) 2-(p-tertiary-butylanilino)-1,3,4-trifluoroanthraquinone, (12) 2-(o-methoxyanilino)-1,3,4-trifluoroanthraquinone, (13) 2-(2,6-diisopropylanilino)-1,3,4-trifluoroanthraquinone, (14) 2-(2,6-dichloroanilino)-1,3,4-trifluoroanthraquinone, (15) 2-(2,6-difluoroanilino)-1,3,4-trifluoroanthraquinone, (16) 2-(3,4-dicyanoanilino)-1,3,4-trifluoroanthraquinone, (17) 2-(2,4,6-trichloroanilino)-1,3,4-trifluoroanthraquinone, (18) 2-(2,3,5,6-tetrachloroanilino)-1,3,4-trifluoroanthraquinone, (19) 2-(2,3,5,6-tetrafluoroanilino)-1,3,4-trifluoroanthraquinone, (20) 3-(2,3,4,5-tetrafluoroanilino)-2-butoxy-1,4-difluoroanthraquinone, (21) 3-(4-cyano-3-chloroanilino)-2-octyloxy-1,4-difluoroanthraquinone, (22) 3-(3,4-dicyanoanilino)-2-hexyloxy-1,4-difluoroanthraquinone, (23) 3-(4-cyano-3-chloroanilino)-1,2-dibutoxy-4-fluoroanthraquinone, (24) 3-(p-cyanoanilino)-2-phenoxy-1,4-difluoroanthraquinone, (25) 3-(p-cyanoanilino)-2-(2,6-diethylphenoxy)-1,4-difluoroanthraquinone, (26) 3-(2,6-dichloroanilino)-2-(2,6-dichlorophenoxy)-1,4-difluoroanthraquinone, (27) 3-(2,3,5,6-tetrachloroanilino)-2-(2,6-dimethoxyphenoxy)-1,4-difluoroanthraquinone, (28) 2,3-dianilino-1,4-difluoroanthraquinone, (29) 2,3-bis(p-tertiary-butylanilino)-1,4-difluoroanthraquinone, (30) 2,3-bis(p-methoxyanilino)-1,4-difluoroanthraquinone, (31) 2,3-bis(2-methoxy-6-methylanilino)-1,4-difluoroanthraquinone, (32) 2,3-bis(2,6-diisopropylanilino)-1,4-difluoroanthraquinone, (33) 2,3-bis(2,4,6-trichloroanilino)-1,4-difluoroanthraquinone, (34) 2,3-bis(2,3,5,6-tetrachloroanilino)-1,4-difluoroanthraquinone, (35) 2,3-bis(2,3,5,6-tetrafluoroanilino)-1,4-difluoroanthraquinone, (36) 2,3-bis(p-cyanoanilino)-1-methoxyethoxy-4-fluoroanthraquinone, (37) 2-(2,6-dichloroanilino)-1,3,4-trichloroanthraquinone, (38) 2-(2,3,5,6-tetrafluoroanilino)-1,3,4-trichloroanthraquinone, (39) 3-(2,6-dichloroanilino)-2-(2,6-dichlorophenoxy)-1,4-dichloroanthraquinone, (40) 2-(2,6-dichloroanilino)anthraquinone, (41) 2-(2,3,5,6-tetrafluoroanilino)anthraquinone, (42) 3-(2,6-dichloroanilino)-2-(2,6-dichlorophenoxy)anthraquinone, (43) 2,3-bis(2-methoxy-6-methylanilino)-1,4-dichloroanthraquinone, (44) 2,3-bis(2,6-diisopropylanilino)anthraquinone, (45) 2-butylamino-1,3,4-trifluoroanthraquinone, (46) 1,4-bis(n-butylamino)-2,3-difluoroanthraquinone, (47) 1,4-bis(n-octylamino)-2,3-difluoroanthraquinone, (48) 1,4-bis(hydroxyethylamino)-2,3-difluoroanthraquinone, (49) 1,4-bis(cyclohexylamino)-2,3-difluoroanthraquinone, (50) 1,4-bis(cyclohexylamino)-2-octyloxy-3-fluoroanthraquinone, (51) 1,2,4-tris(2,4-dimethoxyphenoxy-3-fluoroanthraquinone, (52) 2,3-bis(phenylthio)-1-phenoxy-4-fluoroanthraquinone, and (53) 1,2,3,4-tetra(p-methoxyphenoxy)-anthraquinone, and these can be used singly or in combination of two or more kinds thereof.

When such a fifth light absorber is mixed in as a visible light absorber, among the lights incident to the base material layer 1, a light having a wavelength equal to or more than 600 nm and equal to or less than 720 nm can be reliably absorbed in the base material layer 1.

Regarding such a fifth light absorber, that is, an anthraquinone-based coloring matter having absorption wavelength characteristics of absorbing a light having a wavelength of equal to or more than 600 nm and equal to or less than 720 nm, in the present embodiment, a light absorber having a melting point in the range of equal to or higher than 200° C. and equal to or lower than 330° C. is selected from among the above-mentioned examples. That is, in the present embodiment, this fifth light absorber is a light absorber having a melting point that is the same as or higher than that of the first light absorber and having a melting point that is the same as or lower than that of the second light absorber.

In the present embodiment, the content percentage of the fifth light absorber in the base material layer 1 may be equal to or more than 0.005 wt %; however, the content percentage is preferably equal to or more than 0.005 wt % and equal to or less than 0.200 wt %, and more preferably equal to or more than 0.008 wt % and equal to or less than 0.150 wt %. When the content percentage of the fifth light absorber in the base material layer 1 is less than the above-described lower limit value, depending on the type of the fifth light absorber, the visible light (light having a wavelength equal to or more than 600 nm and equal to or less than 720 nm) absorption property of the base material layer 1 may be deteriorated.

Furthermore, even if the content percentage of the fifth light absorber in the base material layer 1 is more than the above-described upper limit value, further enhancement of the visible light (light having a wavelength equal to or more than 600 nm and equal to or less than 720 nm) absorption property is not observed, and there is a risk that the adhesiveness of the base material layer 1 to the protective layer 2 may be impaired.

The second light absorber has absorption wavelength characteristics of absorbing a light having a wavelength equal to or more than 680 nm and equal to or less than 800 nm. Specifically, this second light absorber may be an anthraquinone-based coloring matter different from the above-mentioned anthraquinone-based coloring matter of the fifth light absorber.

Examples of this anthraquinone-based coloring matter include SDO-12 (manufactured by Arimoto Chemical Co., Ltd., melting point: 319° C.) and SDO-11 (manufactured by Arimoto Chemical Co., Ltd., melting point: 290° C.), and these can be used singly or in combination of two or more kinds thereof.

When such a second light absorber is mixed in as a visible light absorber, among the lights incident to the base material layer 1, a light having a wavelength equal to or more than 680 nm and equal to or less than 800 nm can be reliably absorbed in the base material layer 1.

In the present invention, such a second light absorber, that is, an anthraquinone-based coloring matter is a light absorber having absorption wavelength characteristics of absorbing a light having a wavelength of equal to or more than 680 nm and equal to or less than 800 nm has a melting point in the range of equal to or lower than 330° C. In the present embodiment, this second light absorber is a light absorber having a melting point in the range of equal to or higher than 280° C. and equal to or lower than 330° C. and having the highest melting point among the first to fifth light absorbers. The melting point of the second light absorber is preferably in the range of equal to or higher than 280° C. and equal to or lower than 320° C.

Furthermore, in the present embodiment, the content percentage of the second light absorber in the base material layer 1 may be equal to or more than 0.005 wt %; however, the content percentage is preferably equal to or more than 0.005 wt % and equal to or less than 0.200 wt %, and more preferably equal to or more than 0.008 wt % and equal to or less than 0.150 wt %. When the content percentage of the second light absorber in the base material layer 1 is less than the above-described lower limit value, depending on the type of the second light absorber, the visible light (light having a wavelength equal to or more than 680 nm and equal to or less than 800 nm) absorption property of the base material layer 1 may be deteriorated. Furthermore, even if the content percentage of the second light absorber in the base material layer 1 is more than the above-described upper limit value, further enhancement of the visible light (light having a wavelength equal to or more than 680 nm and equal to or less than 800 nm) absorption property is not observed, and there is a risk that the adhesiveness of the base material layer 1 to the protective layer 2 may be impaired.

The base material layer 1 may further contain an ultraviolet light absorber in addition to the visible light absorber. As a result, the resin material and the visible light absorber included in the base material layer 1 as well as the object material to be covered with the optical layer 10 (cover member) can be accurately suppressed or prevented from being deteriorated by ultraviolet radiation. Therefore, a base material layer 1 having excellent weather resistance can be obtained.

This ultraviolet light absorber is not particularly limited; however, it is preferable that the ultraviolet light absorber includes a light absorber that absorbs a light having a wavelength equal to or more than 100 nm and equal to or less than 400 nm. As a result, the transmission of light having a relatively short wavelength (light having a wavelength equal to or less than 400 nm) among ultraviolet radiation and visible light can be suppressed. Accordingly, the function as an ultraviolet light absorber can be reliably exhibited.

The ultraviolet light absorber is not particularly limited; however, examples thereof include a triazine-based compound, a benzophenone-based compound, a benzotriazole-based compound, and a cyanoacrylate-based compound, and these can be used singly or in combination of two or more kinds thereof. Among these, it is particularly preferable that the ultraviolet light absorber is a triazine-based compound. As a result, deterioration of the base material layer 1 by ultraviolet radiation can be more reliably prevented or suppressed, and the weather resistance of the optical layer 10 can be further enhanced.

Examples of the triazine-based compound include a 2-mono(hydroxyphenyl)-1,3,5-triazine compound, a 2,4-bis(hydroxyphenyl)-1,3,5-triazine compound, and a 2,4,6-tris(hydroxyphenyl)-1,3,5-triazine compound, and specific examples thereof include 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, 2,4-diphenyl-6-(2-hydroxy-4-butoxyethoxy)-1,3,5-triazine, 2,4-bis(2-hydroxy-4-butoxyphenyl)-6-(2,4-dibutoxyphenyl)-1,3,5-triazine, 2,4,6-tris(2-hydroxy-4-methoxyphenyl)-1,3,5-triazine, 2,4,6-tris(2-hydroxy-4-ethoxyphenyl)-1,3,5-triazine, 2,4,6-tris(2-hydroxy-4-propoxyphenyl)-1,3,5-triazine, 2,4,6-tris(2-hydroxy-4-butoxyphenyl)-1,3,5-triazine, 2,4,6-tris(2-hydroxy-4-hexyloxyphenyl)-1,3,5-triazine, 2,4,6-tris(2-hydroxy-4-octyloxyphenyl)-1,3,5-triazine, 2,4,6-tris(2-hydroxy-4-dodecyloxyphenyl)-1,3,5-triazine, 2,4,6-tris(2-hydroxy-4-benzyloxyphenyl)-1,3,5-triazine, 2,4,6-tris(2-hydroxy-4-ethoxyethoxyphenyl)-1,3,5-triazine, 2,4,6-tris(2-hydroxy-4-butoxyethoxyphenyl)-1,3,5-triazine, 2,4,6-tris(2-hydroxy-4-propoxyethoxyphenyl)-1,3,5-triazine, 2,4,6-tris(2-hydroxy-4-methoxycarbonylpropyloxyphenyl)-1,3,5-triazine, 2,4,6-tris(2-hydroxy-4-ethoxycarbonylethyloxyphenyl)-1,3,5-triazine, 2,4,6-tris(2-hydroxy-4-(1-(2-ethoxyhexyloxy)-1-oxopropan-2-yloxy)phenyl)-1,3,5-triazine, 2,4,6-tris(2-hydroxy-3-methyl-4-methoxyphenyl)-1,3,5-triazine, 2,4,6-tris(2-hydroxy-3-methyl-4-ethoxyphenyl)-1,3,5-triazine, 2,4,6-tris(2-hydroxy-3-methyl-4-propoxyphenyl)-1,3,5-triazine, 2,4,6-tris(2-hydroxy-3-methyl-4-butoxyphenyl)-1,3,5-triazine, 2,4,6-tris((2-hydroxy-3-methyl-4-hexyloxyphenyl)-1,3,5-triazine, 2,4,6-tris(2-hydroxy-3-methyl-4-octyloxyphenyl)-1,3,5-triazine, 2,4,6-tris(2-hydroxy-3-methyl-4-dodecyloxyphenyl)-1,3,5-triazine, 2,4,6-tris(2-hydroxy-3-methyl-4-benzyloxyphenyl)-1,3,5-triazine, 2,4,6-tris(2-hydroxy-3-methyl-4-ethoxyethoxyphenyl)-1,3,5-triazine, 2,4,6-tris(2-hydroxy-3-methyl-4- butoxyethoxyphenyl)-1,3,5-triazine, 2,4,6-tris(2-hydroxy-3-methyl-4-propoxyethoxyphenyl)-1,3,5-triazine, 2,4,6-tris(2-hydroxy-3-methyl-4-methoxycarbonylpropyloxyphenyl)-1,3,5-triazine, 2,4,6-tris(2-hydroxy-3-methyl-4-ethoxycarbonylethyloxyphenyl)-1,3,5-triazine, and 2,4,6-tris(2-hydroxy-3-methyl-4-(1-(2-ethoxyhexyloxy)-1-oxo propan-2-yloxy)phenyl)-1,3,5-triazine. Furthermore, examples of commercially available products of the triazine-based ultraviolet light absorber include "TINUVIN 1577", "TINUVIN 460", "TINUVIN 477" (manufactured by BASF Japan Ltd.), and "ADEKASTAB LA-F70" (manufactured by ADEKA Corporation), and these can be used singly or in combination of two or more kinds thereof.

When such an ultraviolet light absorber is mixed into the resin composition for forming a base material layer, a light having a wavelength equal to or more than 100 nm and equal to or less than 400 nm among the light incident to the base material layer 1 can be reliably absorbed in the base material layer 1.

When the base material layer 1 contains an ultraviolet light absorber, the content percentage of the ultraviolet light absorber in the base material layer 1 is preferably equal to or more than 0.005 wt % and equal to or less than 0.200 wt %, and more preferably equal to or more than 0.008 wt % and equal to or less than 0.150 wt %. When the content percentage of the ultraviolet light absorber in the base material layer 1 is less than the above-described lower limit value, depending on the type of the ultraviolet light absorber, there is a risk that the weather resistance of the base material layer 1 may be deteriorated. Furthermore, when the content percentage of the ultraviolet light absorber in the base material layer 1 is more than the above-described upper limit value, further enhancement of the weather resistance is not observed, and there is a risk that the adhesiveness of the base material layer 1 to the protective layer 2 may be impaired.

The base material layer 1 may also include a coloring matter different from the visible light absorber and the ultraviolet light absorber mentioned above as examples (for example, an infrared light absorber or the like). This coloring matter is not particularly limited; however, examples thereof include a pigment and a dye, and these can be used singly or as mixtures.

The pigment is not particularly limited; however, examples thereof include organic pigments, including a phthalocyanine-based pigment such as phthalocyanine green or phthalocyanine blue; an azo-based pigment such as first yellow, disazo yellow, condensed azo yellow, benzimidazolone yellow, dinitroaniline orange, benzimidazolone orange, toluidine red, permanent carmine, permanent red, naphthol red, condensed azo red, benzimidazolone carmine, or benzimidazolone brown; an anthraquinone-based pigment such as anthrapyrimidine yellow or anthraquinonyl red; an azomethine-based pigment such as copper azomethine yellow, a quinophthalone-based pigment such as quinophthalone yellow; an isoindoline-based pigment such as isoindoline yellow; a nitroso-based pigment such as nickel dioxime yellow; a perinone-based pigment such as perinone orange; a quinacridone-based pigment such as quinacridone magenta, quinacridone maroon, quinacridone scarlet, or quinacridone red; a perylene-based pigment such as perylene red or perylene maroon; a pyrrolopyrrole-based pigment such as diketopyrrolopyrrole red; and a dioxazine-based pigment such as dioxazine violet; and inorganic pigments, including a carbon-based pigment such as carbon black, lamp black, furnace black, ivory black, graphite, or fullerene; a chromate-based pigment such as chrome yellow or molybdate orange; a sulfide-based pigment such as cadmium yellow, cadmium lithopone yellow, cadmium orange, cadmium lithopone orange, vermilion, cadmium red, cadmium lithopone red, or sulfide; an oxide-based pigment such as ochre, titanium yellow, titanium barium nickel yellow, red iron oxide, red lead, amber, brown iron oxide, zinc iron chromium brown, chromium oxide, cobalt green, cobalt chromium green, titanium cobalt green, cobalt blue, cerulean blue, cobalt aluminum chromium blue, black iron oxide, manganese ferrite black, cobalt ferrite black, copper chromium black, or copper chromium manganese black; a hydroxide-based pigment such as viridian; a ferrocyanide-based pigment such as iron blue; a silicate-based pigment such as ultramarine blue; a phosphate-based pigment such as cobalt violet or mineral violet; and others (for example, cadmium sulfide and cadmium selenide), and these can be used singly or in combination of two or more kinds thereof.

The dye is not particularly limited; however, examples thereof include a metal complex coloring matter, a cyanine-based coloring matter, a xanthene-based coloring matter, an azo-based coloring matter, a hibiscus coloring matter, a black berry coloring matter, a raspberry coloring matter, a pomegranate juice coloring matter, and a chlorophyll coloring matter, and these can be used singly or in combination of two or more kinds thereof.

By appropriately setting the combination of types of the above-mentioned visible light absorber, ultraviolet light absorber, and coloring matters different from these, and the contents thereof, the base material layer 1 can be made to exhibit a function of selectively allowing transmission of light having a desired wavelength range.

The protective layer 2 covers the base material layer 1 by being provided to be laminated on the base material layer 1 and thereby functions as a hard coat layer (coating layer) that protects the base material layer 1.

This protective layer 2 is formed from a cured product of a resin composition for forming a protective layer. In the present embodiment, the protective layer 2 is formed from a cured product of an ultraviolet-curable resin composition including a bifunctional urethane acrylate (A) as an ultraviolet-curable resin. The resin composition for forming a protective layer may be a thermosetting resin composition.

Regarding the bifunctional urethane acrylate (A), a compound obtained by a reaction between an isocyanate compound obtained by reacting the following polyol with diisocyanate, and an acrylate monomer having a hydroxyl group can be used; however, the combination is not limited thereto.

Examples of the polyol include a polyester polyol, a polyether polyol, and a polycarbonate diol.

Regarding the dicarboxylic acid, for example, adipic acid, succinic acid, glutaric acid, pimelic acid, sebacic acid, azelaic acid, maleic acid, terephthalic acid, isophthalic acid, and phthalic acid are used. Examples of the diol include ethylene glycol, 1,4-butanediol, 1,6-hexanediol, diethylene glycol, and dipropylene glycol.

Examples of the polyether polyol include polyethylene oxide, polypropylene oxide, and an ethylene oxide-propylene oxide random copolymer.

Examples of the polycarbonate diol include 1,4-butanediol, 1,6-hexanediol, ethylene glycol, propylene glycol, diethylene glycol, triethylene glycol, 1,2-propylene glycol, 1,3-propylene glycol, dipropylene glycol, 2-ethyl-1,3-hexanediol, 1,5-pentanediol, 3-methyl-1,5-pentanediol, 1,4-cyclohexanediol, and polyoxyethylene glycol.

The diisocyanate may be a linear or cyclic aliphatic diisocyanate or an aromatic diisocyanate. Examples of the linear or cyclic aliphatic diisocyanate include hexamethylene diisocyanate, isophorone diisocyanate, dicyclohexylmethane diisocyanate, hydrogenated tolylene diisocyanate, and hydrogenated xylylene diisocyanate. Furthermore, examples of the aromatic diisocyanate include tolylene diisocyanate and xylylene diisocyanate.

Examples of the acrylate monomer having a hydroxyl group include 2-hydroxyethyl acrylate, 2-hydroxypropyl acrylate, 2-hydroxybutyl acrylate, 3-hydroxybutyl acrylate, and polyethylene glycol monoacrylate.

The content of the bifunctional urethane acrylate (A) is preferably equal to or more than 1 part by weight and equal to or less than 50 parts by weight, and more preferably equal to or more than 3 parts by weight and equal to or less than 38 parts by weight with respect to 100 parts by weight of the ultraviolet-curable resin. By setting the content to be in such a range, the surface hardness and abrasion resistance are excellent.

The ultraviolet-curable resin other than the bifunctional urethane acrylate (A) may be a synthetic resin in which an ultraviolet-curable monomer, an ultraviolet-curable oligomer, or the like responds to the light energy of ultraviolet radiation and undergoes a chemical change from a liquid to a solid.

Examples of the ultraviolet-curable monomer include a polyfunctional monomer that increases the crosslink density of the protective layer 2 to enhance abrasion resistance, and a lower-functional monomer that can facilitate adjustment of the crosslink density of the protective layer 2 and adjustment of the viscosity of the resin composition and can also enhance the adhesiveness between the protective layer 2 and the resin plate.

Examples of the polyfunctional monomer include pentaerythritol triacrylate, ditrimethylolpropane triacrylate, trimethylolethane triacrylate, trimethylolpropane triacrylate, ethoxylated trimethylolpropane triacrylate, ethoxylated pentaerythritol triacrylate, glycerin triacrylate, tris(acryloyloxyethyl) isocyanurate, ethoxylated pentaerythritol tetraacrylate, pentaerythritol tetraacrylate, dipentaerythritol pentaacrylate, dipentaerythritol hexaacrylate, and tripentaerythritol heptaacrylate.

Regarding the ultraviolet-curable oligomer, a pentafunctional or higher-functional polyfunctional monomer for achieving high hardness is more preferable in view of achieving a balance between excellent hardness and the adhesiveness conforming to the base material.

Examples of the pentafunctional or higher-functional polyfunctional monomer or a compound such as a dimer or oligomer thereof include dipentaerythritol pentaacrylate, dipentaerythritol hexaacrylate, tripentaerythritol heptaacrylate, and tripentaerythritol octaacrylate.

The term "pentafunctional" means that the number of functional groups in one molecule that undergo a polymerization reaction by means of ultraviolet radiation, such as an acrylic group, a methacrylic group, or a vinyl group, is 5.

Examples of the lower-functional monomer include pentaerythritol tetraacrylate, ditrimethylolpropane triacrylate, trimethylolpropane triacrylate, pentaerythritol triacrylate, dipentaerythritol triacrylate, ethoxylated trimethylolpropane triacrylate, ethoxylated pentaerythritol triacrylate, ethoxylated pentaerythritol tetraacrylate, polyethylene glycol diacrylate, ethoxylated bisphenol A diacrylate, ethoxylated hydrogenated bisphenol A diacrylate, ethoxylated cyclohexanedimethanol diacrylate, tricyclodecanedimethanol diacrylate, 2-hydroxyethyl acrylate, 2-hydroxypropyl acrylate, 2-hydroxybutyl acrylate, 3-hydroxybutyl acrylate, polyethylene glycol monoacrylate, acryloylmorpholine, N-vinylpyrrolidone, N-vinylformamide, isobornyl acrylate, polyethylene glycol diacrylate, polypropylene glycol diacrylate, ethoxylated bisphenol A diacrylate, ethoxylated hydrogenated bisphenol A diacrylate, ethoxylated cyclohexanedimethanol diacrylate, and tricyclodecanedimethanol diacrylate.

Examples of the ultraviolet-curable oligomer include a urethane acrylate oligomer, an epoxy acrylate oligomer, and a polyester acrylate oligomer.

The urethane acrylate oligomer can be obtained by, for example, a reaction between an isocyanate compound, which is obtained by causing a polyol to react with a diisocyanate, and an acrylate monomer having a hydroxyl group.

The epoxy acrylate oligomer can be obtained by, for example, an esterification reaction between an oxirane ring of a bisphenol-type epoxy resin or novolac epoxy resin having a low molecular weight and an acrylic acid.

The polyester acrylate oligomer can be obtained by, for example, producing a polyester oligomer having hydroxyl groups at both ends by condensation of a polyvalent carboxylic acid and a polyhydric alcohol, and then esterifying the hydroxyl groups at the two ends with acrylic acid.

The ultraviolet-curable oligomer is preferably a urethane acrylate oligomer in particular, and a pentafunctional or higher-functional ultraviolet-curable oligomer for achieving high hardness is more preferable in view of achieving a balance between excellent hardness and adhesiveness conforming to the base material.

The ultraviolet-curable oligomer is used to satisfy various physical properties (scratch resistance, abrasion resistance, impact resistance, processability, flexibility, and the like) required for the protective layer 2, and for example, urethane acrylate may be mentioned.

Urethane acrylate can be obtained by, for example, a reaction between an isocyanate compound, which is obtained by causing a polyol to react with a diisocyanate, and an acrylate monomer having a hydroxyl group.

Furthermore, it is preferable that the ultraviolet-curable resin composition that is used for the protective layer 2 contains a polymerization initiator.

The photopolymerization initiator is added to the ultraviolet-curable resin composition in order to initiate the reaction (polymerization) of the ultraviolet-curable resin through irradiation with ultraviolet radiation.

Examples of this photopolymerization initiator include benzoin or benzoin alkyl ethers such as benzoin, benzoin methyl ether, and benzoin isopropyl ether; aromatic ketones such as benzophenone and benzoyl benzoic acid; alpha-dicarbonyls such as benzyl; benzyl ketals such as benzyl dimethyl ketal and benzyl diethyl ketal; acetophenones such as acetophenone, 1-(4-dodecylphenyl)-2-hydroxy-2-methylpropan-1-one, 1-hydroxycyclohexyl phenyl ketone, 2-hydroxy-2-methyl-1-phenyl-1-propan-1-one, 1-(4-isopropylphenyl)-2-hydroxy-2-methyl-propan-1-one, and 2-methyl-1-[4-(methylthio)phenyl]-2-morpholinopropanone-1; anthraquinones such as 2-methylanthraquinone, 2-ethylanthraquinone, and 2-t-butylanthraquinone; thioxanthones such as 2,4-dimethylthioxanthone, 2-isopropylthioxanthone, and 2,4-diisopropylthioxanthone; phosphine oxides such as bis(2,4,6-trimethylbenzoyl)-phenylphosphine oxide; alpha-acyloximes such as 1-phenyl-1,2-propanedione-2-[o-ethoxycarbonyl]oxime; and amines such as ethyl p-dimethylaminobenzoate and isoamyl p-dimethylaminobenzoate.

In addition, the protective layer 2 may also include a surface conditioner, a diluting solvent, an ultraviolet absorber, a photostabilizer, and the like as necessary.

When the ultraviolet-curable resin composition is applied on the top face of the base material layer 1 to form a coating film, the surface conditioner can impart wettability and uniformity of the coating film to the base material layer 1, smoothness and slipperiness of the coating film surface, and the like. Examples of such a surface conditioner include a silicone-based surface conditioner and an acrylic copolymer-based surface conditioner, and a silicone-based surface conditioner is particularly preferable.

Examples of this silicone-based surface conditioner include polydimethylsiloxane and a modified silicone obtained by modifying polydimethylsiloxane. Examples of the modified silicone include a polyether-modified product, an alkyl-modified product, and a polyester-modified product.

The diluting solvent is added to the ultraviolet-curable resin composition as necessary in order to facilitate coating of the ultraviolet-curable resin composition on the base material layer 1.

Examples of such a diluting solvent include aliphatic hydrocarbons such as hexane, heptane, and cyclohexane; aromatic hydrocarbons such as toluene and xylene, alcohols such as methanol, ethanol, propanol, and butanol; ketones such as methyl ethyl ketone, 2-pentanone, and isophorone; esters such as ethyl acetate, butyl acetate, and methoxypropyl acetate; cellosolve-based solvents such as ethyl cellosolve; and glycol-based solvents such as methoxypropanol, ethoxypropanol, and methoxybutanol.

Examples of the ultraviolet absorber include a benzotriazole-based compound and a hydroxyphenyltriazine-based compound.

Furthermore, regarding the photostabilizer, a hindered amine-based compound and the like may be mentioned.

The thickness of the protective layer 2 is not particularly limited; however, the thickness is preferably equal to or more than 1 μm and equal to or less than 40 μm, and more preferably equal to or more than 3 μm and equal to or less than 20 μm. When the thickness of the protective layer 2 is less than the above-described lower limit value, the weather resistance of the optical layer 10 may be deteriorated. On the other hand, when the thickness of the protective layer 2 is more than the above-described upper limit value, in a case where the optical layer 10 is molded into a curved surface shape, cracks may occur at a bending portion.

In a case where it is not necessary to impart excellent weather resistance, durability, and scratch resistance to the optical layer 10, the optical layer 10 may be formed without this protective layer 2.

<Method for Producing Optical Layer>

The optical layer 10 having a configuration such as described above can be obtained by, for example, the following production method.

The method for producing the optical layer 10 has a base material layer forming step of forming a base material layer 1; a coating layer forming step of applying a resin composition for forming a protective layer on the top face of the base material layer 1 to form a coating layer; and a protective layer forming step of drying the coating layer to form a protective layer 2 on the base material layer 1 and thereby obtaining an optical layer 10.

Hereinafter, each step will be described.

(Base Material Layer Forming Step)

[1] First, a base material layer 1 produced as a band-shaped sheet is formed.

[1-1] First, a molten sheet is formed by extruding a resin composition for forming the base material layer 1, the resin composition being in a molten state or a softened state, into a band shape (extrusion step).

In this extrusion step, a resin composition (resin composition of the present invention) in which the above-mentioned constituent materials constituting the base material layer 1 (first layer) are kneaded is put into an extrusion molding machine and is melted. Next, the molten resin in a molten state is extruded through, for example, an opening provided in the T-die of the extrusion molding machine. As a result, a molten sheet in a molten state or a softened sheet in a softened state, both of the sheets being produced as a band-shaped sheet, can be continuously sent out.

Meanwhile, in the present embodiment, the resin composition for forming the base material layer 1 includes a first light absorber that absorbs a light having a wavelength equal to or more than 360 nm and equal to or less than 500 nm, a third light absorber that absorbs a light having a wavelength equal to or more than 450 nm and equal to or less than 580 run, a fourth light absorber that absorbs a light having a wavelength equal to or more than 500 nm and equal to or less than 660 run, a fifth light absorber that absorbs a light having a wavelength equal to or more than 600 nm and equal to or less than 720 nm, and a second light absorber that absorbs a light having a wavelength equal to or more than 680 nm and equal to or less than 800 nm, as visible light absorbers, each of the contents of which in the resin composition is equal to or more than 0.005 wt %. Each of such visible light absorbers, that is, the first light absorber to the fifth light absorber, has a melting point in the above-mentioned range. Therefore, the first light absorber has the lowest melting point, and the second light absorber has the highest melting point. Specifically, the melting points of the first light absorber to the fifth light absorber are within the range of equal to or higher than 200° C. and equal to or lower than 330° C., that is, the melting point of the first light absorber is equal to or higher than 200° C., and the melting point of the second light absorber is equal to or lower than 330° C.

In the related art technologies, when a light absorber having such a high melting point is included in the resin composition for forming the base material layer 1 (first layer), as disclosed in the background art described above, the light absorber cannot be uniformly dissolved and dispersed in the first layer formed by using this resin composition, and because of this, there is a problem that the external appearance of the optical layer provided with this first layer is impaired.

In contrast, in the present embodiment, the viscosity at 260° C. of the resin composition including a polycarbonate-based resin and these first light absorber to fifth light absorber, that is, visible light absorbers, is set to be equal to or more than 400 Pa·s and equal to or less than 3500 Pa·s, when the shear rate is 243.2 [1/sec]. Therefore, even if a light absorber having a high melting point is included in the resin composition for forming the base material layer 1, when this resin composition is kneaded to obtain a molten resin in a molten state, the first light absorber to the fifth light absorber can be uniformly dissolved and dispersed in the resin composition. As a result, the first light absorber to the fifth light absorber can be uniformly dissolved and dispersed even in the base material layer 1 that is formed in the subsequent step [1-3], and therefore, the optical layer 10 provided with this base material layer 1 can be formed to have excellent external appearance.

Furthermore, in order to set the viscosity at 260° C. of the resin composition to be equal to or more than 400 Pa·s and equal to or less than 3500 Pa·s obtainable when the shear rate is 243.2 [1/sec], the viscosity can be realized by appropriately adjusting at least one of the type, content, weight-average molecular weight Mw, and the molecular weight distribution (Mw/Mn), which is the ratio of the weight-average molecular weight Mw and the number-average molecular weight Mn, of the polycarbonate-based resin included in the resin composition. Among these, it is preferable that by adjusting at least one of the weight-average molecular weight Mw and the ratio Mw/Mn, the viscosity at 260° C. of the resin composition obtainable when the shear rate is 243.2 [1/sec], is set to be within the above-described range. By adjusting at least one of the weight-average molecular weight Mw and the ratio Mw/Mn, the viscosity at 260° C. of the resin composition obtainable when the shear rate is 243.2 [1/sec], can be set to be within the above-described range relatively easily.

Specifically, the weight-average molecular weight Mw may slightly vary depending on the type of the polycarbonate-based resin; however, the weight-average molecular weight Mw is preferably equal to or more than $1.2 \times 10^4$ and equal to or less than $3.5 \times 10^4$, and more preferably equal to or more than $1.5 \times 10^4$ and equal to or less than $3.0 \times 10^4$.

In addition, the ratio Mw/Mn may slightly vary depending on the type of the polycarbonate-based resin; however, the ratio is preferably equal to or more than 1.0 and equal to or less than 2.0, and more preferably equal to or more than 1.2 and equal to or less than 1.8.

By setting the weight-average molecular weight Mw and the ratio Mw/Mn to be in the above-described ranges, respectively, the viscosity at 260° C. of the resin composition obtainable when the shear rate is 243.2 [1/sec] can be reliably set to be in the above-described range.

The weight-average molecular weight (Mw), the number-average molecular weight (Mn), and the molecular weight distribution (Mw/Mn) can be calculated using, for example, the measured values obtained by GPC (Gel Permeation Chromatography) measurement.

Furthermore, when the resin composition for forming the base material layer 1 is kneaded to obtain a molten resin in a molten state, the temperature at which this resin composition is heated is preferably set to be equal to or higher than 210° C. and equal to or lower than 330° C., and more preferably equal to or higher than 230° C. and equal to or lower than 315° C. As a result, the effect obtainable by setting the viscosity at 260° C. of the resin composition when the shear rate is 243.2 [1/sec] to be within the above-described range can be exhibited more notably.

Here, with regard to the resin composition for forming the base material layer 1, the viscosity at 260° C. obtainable when the shear rate is 243.2 [1/sec] may be equal to or more than 400 Pa·s and equal to or less than 3500 Pa·s; however, the viscosity is preferably equal to or more than 600 Pa·s and equal to or less than 3000 Pa·s. Furthermore, it is preferable that the viscosity at 270° C. when the shear rate is 243.2 [1/sec] is equal to or more than 300 Pa·s and equal to or less than 2500 Pa·s, and more preferably equal to or more than 500 Pa·s and equal to or less than 2500 Pa·s. As a result, when the resin composition is kneaded to obtain a molten resin in a molten state, the first light absorber to the fifth light absorber can be more uniformly dissolved and dispersed in the resin composition.

With regard to the resin composition for forming the base material layer 1, when the viscosity measured at a shear rate of 12.16 [1/s] at 260° C. is denoted by $\eta 1$, and the viscosity measured at a shear rate of 2432 [1/s] is denoted by $\eta 5$, the thixotropic index, which is the viscosity ratio ($\eta 1/\eta 5$), is preferably equal to or higher than 5.0 and 15.0, and more preferably equal to or higher than 6.0 and 14.0. As a result, when the resin composition is kneaded to obtain a molten resin in a molten state, the first light absorber to the fifth light absorber can be more uniformly dissolved and dispersed in the resin composition.

Furthermore, the melting point of the first light absorber having the lowest melting point may be equal to or higher than 200° C., and the melting point of the second light absorber having the highest melting point may be equal to or lower than 330° C.; however, it is preferable that the melting point of the first light absorber is equal to or higher than 240° C., while the melting point of the second light absorber is equal to or lower than 320° C. A resin composition for forming the base material layer 1, which contains such first to fifth light absorbers, including a first light absorber having the lowest melting point and a second light absorber having the highest melting point, can more notably exhibit the effect obtained by setting the viscosity at 260° C. obtainable when the shear rate is 243.2 [1/sec], to be equal to or more than 400 Pa·s and equal to or less than 3500 Pa·s. That is, when the resin composition is kneaded to obtain a molten resin in a molten state, the first light absorber to the fifth light absorber can be more uniformly dissolved and dispersed in the resin composition.

[1-2] Next, the base material layer 1 in the molten state or the softened state is molded by flattening both faces of the molten sheet and at the same time, setting the molten sheet to have a predetermined thickness (molding step).

This molding step is carried out by, for example, supplying the molten sheet between two rolls.

At this time, the outer peripheral surfaces of the two rolls each have a roll shape having smoothness. Therefore, both faces of the molten sheet are flattened by being pressed against the outer peripheral surfaces having smoothness.

Further, the separation distance between the outer peripheral surfaces of the two rolls is set as the thickness of the base material layer 1 to be formed, and by appropriately setting this separation distance to a predetermined magnitude, a molten sheet having a desired thickness (base material layer 1) can be obtained.

As such, in the present step [1-2], the two rolls are respectively used to flatten the both faces of the molten sheet and to set the thickness of the molten sheet.

[1-3] Next, the molten sheet in the molten state (or the softened sheet in the softened state), which has both faces flattened and is set to a predetermined thickness, is cooled (cooling step).

As a result, the base material layer 1 formed from a resin composition including a polycarbonate-based resin as a main material and a visible light absorber that absorbs visible light, is formed.

This cooling step can be carried out by, for example, bringing the molten sheet into close contact with a cooling roll having cooling means.

By carrying out the base material layer forming step as described above, the base material layer 1 (molded body of the present invention) produced as a band-shaped sheet is formed.

In the step [1], a case where the base material layer 1 (first layer) is formed by producing the molten resin in the molten state directly into a sheet form and then cooling has been described; however, the invention is not limited to this case, and for example, the base material layer 1 may be molded as follows. That is, a granular body (molded body of the present invention) constituting a granular form is molded using a molten resin obtained by bringing the resin composition for forming the base material layer 1 (resin composition of the present invention) into a molten state, subsequently a molten resin constituting a sheet form in a molten state is obtained using this granular body, and then this molten resin may be cooled to form the base material layer 1.

(Coating Layer Forming Step)

[2] Next, a resin composition for forming a protective layer, which is intended for forming the protective layer 2, is prepared, and then this resin composition for forming a protective layer is applied on the top face of the base material layer 1 to form a coating layer.

The method of applying the resin composition for forming a protective layer is not particularly limited; however, examples include known methods such as a roll coating method, a flow coating method, a spray coating method, a curtain coating method, a dip coating method, a die coating method, and a bar coating method, and the resin composition for forming a protective layer can be applied on the top face of the base material layer 1 by using these methods singly or in combination.

(Flat Plate Forming Step)

[3] Next, a protective layer 2 is formed by drying the applied resin composition for forming a protective layer, which constitutes the coating layer, and then curing the composition with ultraviolet radiation.

For example, in a case where the resin composition for forming a protective layer includes a solvent (diluting solvent), the solvent is sufficiently dried by heating the resin composition by raising the temperature of the base material layer 1 and the atmosphere, a dried coating film is formed, and thus a protective layer 2 is obtained.

The method of heating the coating layer is not particularly limited; however, for example, a method of heating using an oven or the like may be mentioned.

By carrying out steps such as described above, an optical layer 10 having a flat plate shape can be obtained.

(Molding Step)

[4] Furthermore, when a portion or the entirety of the optical layer 10 having a flat plate shape is molded into a curved surface shape, a molding step of molding a portion or the entirety of the optical layer 10 having a flat plate shape into a curved surface shape is carried out after the flat plate forming step.

Regarding a method of molding a portion or the entirety of the optical layer 10 into a curved surface shape, for example, a method of heating the optical layer 10 having a flat plate shape, and pressing the optical layer 10 against a mold immediately after the resin has been softened, to mold the optical layer 10 into a curved surface shape, may be mentioned.

The method of heating the resin is not particularly limited, and examples thereof include known methods such as an infrared drying furnace, a gas type hot air drying furnace, and a hot air circulation type drying furnace. Furthermore, examples of a method of performing thermal molding include methods such as vacuum molding, compressed air molding, press molding, and free blow molding.

The above-described curved surface shape is a shape having a curved surface, and for example, a shape in which the cross-sectional shape of a molded body is arc-shaped may be mentioned.

As described above, an optical layer 10 in which a portion or the entirety of the optical layer 10 having a flat plate shape has been molded into a curved surface shape, can be obtained.

Second Embodiment

Next, a second embodiment of the optical layer of the present invention will be described.

Figure 2:
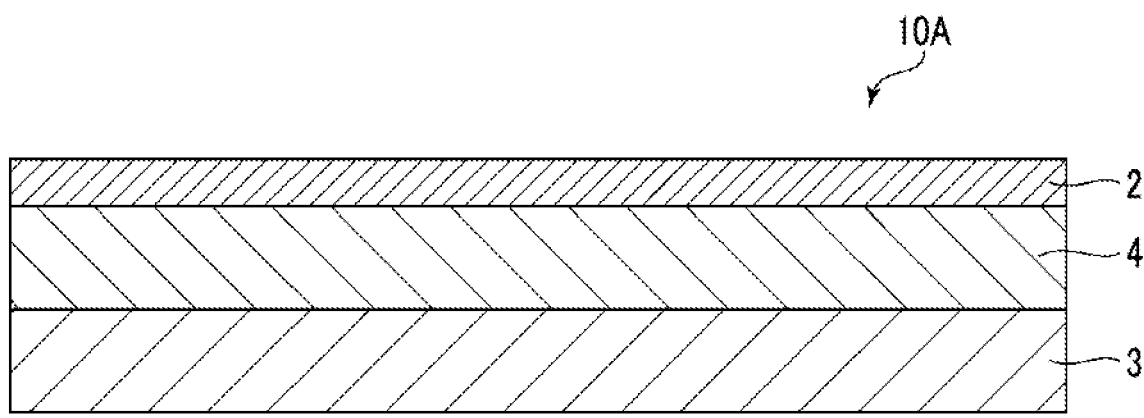
FIG. 2 is a vertical cross-sectional view illustrating a second embodiment of the optical layer of the present invention.

FIG. 2 is a vertical cross-sectional view illustrating a second embodiment of the optical layer of the present invention.

In the following description, an optical layer 10A of the second embodiment will be described, focusing on the differences with the optical layer 10 of the first embodiment, and similar matters will not be described again.

The optical layer 10 A of the present embodiment is similar to the first embodiment, except that the configuration of the base material layer is different.

In the present embodiment, the optical layer 10A is a laminated body having a visible light absorbing layer 3 that absorbs visible light; an ultraviolet absorbing layer 4 that absorbs ultraviolet radiation; and a protective layer 2 (second layer), the laminated body having these laminated in order from the lower side (see FIG. 2). That is, in the present embodiment, the base material layer 1 in the first embodiment is configured as a laminated body of a visible light absorbing layer 3 and an ultraviolet absorbing layer 4.

In such a laminated body, the visible light absorbing layer 3 is composed of a first layer which includes a polycarbonate-based resin having light-transmitting properties as a main material; and a visible light absorber that is dissolved and dispersed in this polycarbonate-based resin and absorbs visible light, and thereby has a function of suppressing or preventing transmission of visible light in a specific wavelength range and allows transmission of light having a desired wavelength range. Furthermore, the ultraviolet absorbing layer 4 includes a resin material having light-transmitting properties as a main material; and an ultraviolet light absorber that is dissolved and dispersed in the resin material and absorbs ultraviolet radiation, and thereby has a function of allowing transmission of infrared radiation and visible light and suppressing or preventing transmission of ultraviolet radiation.

The resin material included in the ultraviolet absorbing layer 4 is included as a main material of the ultraviolet absorbing layer 4 and contributes to molding of the ultraviolet absorbing layer 4 into a substrate shape. Examples of such a resin material include an acrylic resin, a polystyrene-based resin, a polyethylene-based resin, a polypropylene-based resin, a polyester-based resin such as polyethylene terephthalate (PET) or polyethylene naphthalate (PEN), a polycarbonate-based resin, a vinyl chloride-based resin, and a polyacetal-based resin, and these can be used singly or in combination of two or more kinds thereof.

Similarly to the visible light absorber included in the base material layer 1 of the first embodiment, in the present embodiment, the visible light absorber included in the visible light absorbing layer 3 includes a first light absorber absorbing a light having a wavelength equal to or more than 360 nm and equal to or less than 500 nm, a third light absorber absorbing a light having a wavelength equal to or more than 450 nm and equal to or less than 580 nm, a fourth light absorber absorbing a light having a wavelength equal to or more than 500 nm and equal to or less than 660 nm, a fifth light absorber absorbing a light having a wavelength equal to or more than 600 nm and equal to or less than 720 nm, and a second light absorber absorbing a light having a wavelength equal to or more than 680 nm and equal to or less than 800 nm. Furthermore, regarding these first to fifth light absorbers, light absorbers of the same types as those described as the first to fifth light absorbers included in the base material layer 1 in the first embodiment can be used.

Similarly to the ultraviolet light absorber that may be included in the base material layer 1 of the first embodiment, in the present embodiment, it is preferable that the ultraviolet light absorber included in the ultraviolet absorbing layer 4 includes a light absorber absorbing a light having a wavelength equal to or more than 100 nm and equal to or less than 400 nm. Furthermore, regarding this ultraviolet light absorber, an ultraviolet light absorber of the same type as that described as the ultraviolet light absorber which may be included in the base material layer 1 in the first embodiment can be used.

In the present embodiment as such, the base material layer is configured as a laminated body of the visible light absorbing layer 3 and the ultraviolet absorbing layer 4 as described above, while in such a laminated body, the visible light absorbing layer 3 is composed of a first layer, and since the resin composition constituting this first layer satisfies the requirement that the viscosity at 260° C. obtainable when the shear rate is 243.2 [1/sec] is equal to or more than 400 Pa·s and equal to or less than 3500 Pa·s, the first layer molded using such a resin composition, that is, the visible light absorbing layer 3, is formed to have excellent external appearance.

The optical layer described above is applied to cover members for covering various sensors and cameras provided in a moving body such as an automobile or a two-wheeled vehicle. In addition to such application examples, the above-mentioned optical layer can be applied to, for example, a cover member included in a brake lamp or a hazard lamp included in a moving body, a spoiler included in a moving body, a lens material (cover member) included in a surveillance camera, and the like.

Furthermore, when the optical layer of the present invention is applied to cover members covering various sensors, as described above, in addition to the application to various sensors (built-in sensors and the like) provided in moving bodies such as automobiles, for example, application to sensors (built-in sensors and the like) provided in automatic ticket vending machines, vending machines, and the like installed outdoors.

In addition, the moving body (moving body of the present invention) including the optical layer of the present invention as a cover member may be an automobile, a two-wheeled vehicle (motor cycle or bicycle), a ship, a railroad vehicle, an airplane, a bus, a forklift, a working vehicle carrying out a predetermined work in a construction site or the like, a golf cart, an automatic guided vehicle, or the like.

Thus, the resin composition, the molded body, the optical layer, the cover member, and the moving body of the present invention have been described; however, the present invention is not limited to this.

For example, in the optical layer of the present invention, each configuration can be replaced with any configuration capable of exhibiting similar functions, or any configuration can be added.

Furthermore, as the light absorber to be included in the resin composition and the optical layer of the present invention, the first to fifth light absorbers are included in the above-described embodiment, and among these, a case in which the melting point of the first light absorber having the lowest melting point is equal to or higher than 200° C. and the melting point of the second light absorber having the highest melting point is equal to or lower than 330° C., has been described; however, the light absorbers are not limited to this combination. Specifically, when the requirement that the melting point of the first light absorber having the lowest melting point is equal to or higher than 200° C. and the melting point of the second light absorber having the highest melting point is equal to or lower than 330° C. is satisfied, the other light absorbers may or may not be included. Meanwhile, when the other light absorbers are included, the melting points of the other light absorbers may satisfy the requirement of equal to or higher than 200° C. and equal to or lower than 330° C.

EXAMPLES

Hereinafter, the present invention will be more specifically described based on Examples. However, the present invention is not intended to be limited by these Examples.

1. Formation of First Layer Included in Optical Layer

Example 1

[1] First, 99.651 wt % of a bisphenol A-type polycarbonate (manufactured by Mitsubishi Engineering-Plastics Corporation, "Iupilon E2000-F", Mn: $2.7 \times 10^4$, Mw/Mn: 1.6), 0.020 wt % of a first light absorber (quinoline; manufactured by Arimoto Chemical Co., Ltd., "FS yellow 1035", melting point: 243° C.), 0.100 wt % of a third light absorber (perinone; manufactured by Arimoto Chemical Co., Ltd., "plast red 8370", melting point: 254° C.), 0.100 wt % of a fourth light absorber (anthraquinone A; manufactured by Arimoto Chemical Co., Ltd., "plast blue 8580", melting point: 243° C.), 0.050 wt % of a fifth light absorber (anthraquinone B; manufactured by Lanxess AG, "Macrolex green G", melting point: 245° C.), and 0.080 wt % of a second light absorber B (anthraquinone C; manufactured by Arimoto Chemical Co., Ltd., "SDO-12", melting point: 319° C.) were mixed and stirred together, and thereby a resin composition (resin composition for forming a base material layer) was prepared.

[2] Next, the prepared resin composition for forming a base material layer was put into an extrusion molding machine, melted at 260° C., and a sheet material was obtained by extrusion molding of extruding through a T-die. Then, the sheet material was cooled to obtain a sheet material (molded material). The sheet material was cut into a plate shape forming a rectangle having an average thickness of 2.0 mm and having a size of 200 mm×100 mm as viewed in plan view, and thereby a base material layer 1 (first layer) of Example 1 was obtained.

Examples 2 to 9 and Comparative Examples 1 and 2

Base material layers 1 of Examples 2 to 9 and Comparative Examples 1 and 2 were obtained in the same manner as in Example 1, except that the resin compositions were prepared by changing the types of the constituent materials included in the resin compositions and the contents of the constituent materials as shown in Table 1.

Regarding a polycarbonate-based resin other than the above-mentioned polycarbonate-based resin, a bisphenol A type polycarbonate (manufactured by Mitsubishi Engineering-Plastics Corporation, "Iupilon H3000", Mn: $2.2 \times 10^4$, Mw/Mn: 1.7), an isosorbide-derived polycarbonate-based resin (manufactured by Mitsubishi Chemical Corporation, "DURABIO"), and a bisphenol A type polycarbonate (manufactured by Mitsubishi Engineering-Plastics Corporation, "Iupilon H4000") were prepared. Furthermore, regarding an absorber other than the above-described light absorbers, a sixth light absorber (anthraquinone E; manufactured by Arimoto Chemical Co., Ltd., "plast blue 8540", melting point: 146° C.) and a second light absorber A (anthraquinone D; manufactured by Arimoto Chemical Co., Ltd., "SDO-11", melting point: 290° C.) were prepared.

2. Evaluation

The optical layers of each of the Examples and each of the Comparative Examples were evaluated by the following methods.

2-1. Viscosity of Resin Composition

The viscosity [Pa·s] at 260° C. and 270° C. of the resin composition used for forming the base material layer 1 (first layer) of each Example or each Comparative Example, which was obtained when the shear rate was 243.2 [1/sec], was measured using a Capillograph 1B device (manufactured by Toyo Seiki Kogyo Co., Ltd.).

2-2. Thixotropic Index of Resin Composition

For the resin composition used for forming the base material layer 1 (first layer) of each Example or each Comparative Example, the viscosity η1 [Pa·s] measured at a shear rate of 12.16 [1/s] at 260° C. and the viscosity η5 [Pa·s] measured at a shear rate of 2432 [1/s] were measured using a Capillograph 1B device (manufactured by Toyo Seiki Kogyo Co., Ltd.), and then based on these measured values, the thixotropic index, which is the viscosity ratio (η1/η5), was calculated.

2-3. External Appearance of Base Material Layer 1 (First Layer)

The external appearance of each base material layer of each Example or each Comparative Example was observed and evaluated according to the following evaluation criteria.
<Evaluation Criteria>
A: Black spots caused by aggregation of the light absorbers are not recognized in the base material layer, and the base material layer has excellent external appearance.
B: Some black spots caused by aggregation of the light absorbers are recognized in the base material layer; however, practically no change is recognized in the external appearance of the base material layer as compared with the external appearance of the rating A.
C: Black spots caused by aggregation of the light absorbers are recognized in the base material layer, and a clear change is recognized in the external appearance of the base material layer as compared with the external appearance of the rating A.
D: Clear black spots caused by aggregation of the light absorbers are recognized in the base material layer, and a noticeable change is recognized in the external appearance of the base material layer as compared with the external appearance of the rating A.

2-4. Production Stability of Molded Material

The temperature inside the extrusion molding machine was set to 260° C., and the resin composition for forming a base material layer prepared in each Example or each Comparative Example was kneaded, melted, and further cooled to obtain a molded body (molded material). For each Example and each Comparative Example, the phenomena that occurred were observed and evaluated according to the following evaluation criteria.
<Evaluation Criteria>
A: The molded material can be produced stably.
B: The discharge of the extrusion molding machine is not stable; however, the molded material can be produced.
C: The discharge of the extrusion molding machine fluctuates greatly. Alternatively, drips are generated from the inside of the extrusion molding machine, and the extrusion molding machine cannot operate continuously.

The evaluation results for the base material layer of each Example or each Comparative Example obtained as described above and the evaluation results for the production stability of the molded material are respectively shown in the following Table 1.

TABLE 1

| | | Product Name | | Example 1 | Example 2 | Example 3 | Example 4 | Example 5 | Example 6 |
|---|---|---|---|---|---|---|---|---|---|
| Base Material Layer | Polycarbonate-based resin | Iupilon E2000-F (Mn: 2.7 × 10$^4$, Mw/Mn: 1.6) | (wt %) | 99.651 | 99.706 | | 99.602 | 99.880 | 99.602 |
| | | Iupilon B3000 (Mn: 2.2 × 10$^4$, Mw/Mn: 1.7) | (wt %) | | | 99.631 | | | |
| | | DURABIO | (wt %) | | | | | | |
| | | Tupilon B4000 | (wt %) | | | | | | |
| | Fifth light absorber | Macrolex green G (anthraquinone B, melting point: 245° C.) | (wt %) | 0.050 | 0.050 | 0.050 | 0.299 | | |
| | Third light absorber | plant red 8370 (parinone, melting point: 254° C.) | (wt %) | 0.100 | 0.100 | 0.100 | | 0.020 | |
| | Fourth light absorber | plast blue 8580 (anthraquinone A, melting point: 243° C.) | (wt %) | 0.100 | 0.100 | 0.100 | | | 0.299 |
| | First light absorber | FS yellow 1035 (quinoline, melting point: 243° C.) | (wt %) | 0.020 | 0.020 | 0.020 | | | |
| | Sixth light absorber | plast blue 8540 (anthraquinone E, melting point: 146° c.) | (wt %) | | | | | | |
| | Second light absorber A | SDO-11 (anthraquinone D, melting point: 290° C.) | (wt %) | | | | | | |
| | Second light absorber B | SDO-12 (anthraquinone C, melting point: 319° C.) | (wt %) | 0.080 | 0.025 | 0.100 | 0.100 | 0.100 | 0.100 |
| | | Total | | 100.00 | 100.00 | 100.00 | 100.00 | 100.00 | 100.00 |

TABLE 1-continued

| Evaluation | Viscosity of resin composition | 260° C. (@243.2 1/sec) | (Pa·s) | 2812 | 2669 | 766.2 | 2680 | 2838 | 2763 |
| --- | --- | --- | --- | --- | --- | --- | --- | --- | --- |
| | | 270° C. (@243.2 1/sec) | (Pa·s) | 2072 | 2067 | 582.2 | 2119 | 2072 | 2069 |
| | Thixotropic index of resin composition | 260° C. (η1 12.16/η5 2432) | | 10.2 | 9.5 | 7.6 | 9.0 | 9.5 | 8.9 |
| | External appearance | | Presence or absence of change | A | A | A | A | A | A |
| | Production stability | | | A | A | A | A | A | A |

| | | Product Name | | Example 7 | Example 8 | Example 9 | Comparative example 1 | Comparative example 2 |
| --- | --- | --- | --- | --- | --- | --- | --- | --- |
| Base Material Layer | Polycarbonate-based resin | Iupilon E2000-F (Mn: 2.7 × 10$^4$, Mw/Mn: 1.6) | (wt %) | 97.943 | | 99.631 | | |
| | | Iupilon B3000 (Mn: 2.2 × 10$^4$, Mw/Mn: 1.7) | (wt %) | | | | | |
| | | DURABIO | (wt %) | | 99.631 | | | |
| | | Tupilon B4000 | (wt %) | | | | 99.631 | |
| | Fifth light absorber | Macrolex green G (anthraquinone B, melting point: 245° C.) | (wt %) | | 0.050 | 0.050 | 0.050 | |
| | Third light absorber | plant red 8370 (parinone, melting point: 254° C.) | (wt %) | | 0.100 | 0.100 | 0.100 | |
| | Fourth light absorber | plast blue 8580 (anthraquinone A, melting point: 243° C.) | (wt %) | | 0.100 | 0.100 | 0.100 | |
| | First light absorber | FS yellow 1035 (quinoline, melting point: 243° C.) | (wt %) | 1.959 | 0.020 | 0.020 | 0.020 | |
| | Sixth light absorber | plast blue 8540 (anthraquinone E, melting point: 146° c.) | (wt %) | | | | | 0.289 |
| | Second light absorber A | SDO-11 (anthraquinone D, melting point: 290° C.) | (wt %) | | | 0.100 | | |
| | Second light absorber B | SDO-12 (anthraquinone C, melting point: 319° C.) | (wt %) | 0.098 | 0.100 | | 0.100 | 0.100 |
| | | Total | | 100.00 | 100.00 | 100.00 | 100.00 | 100.00 |
| Evaluation | Viscosity of resin composition | 260° C. (@243.2 1/sec) | (Pa·s) | 2288 | 442.1 | 2822 | 379.1 | 2588 |
| | | 270° C. (@243.2 1/sec) | (Pa·s) | 1791 | 364.7 | 2082 | 280.1 | 1991 |
| | Thixotropic index of resin composition | 260° C. (η1 12.16/η5 2432) | | 9.7 | 7.8 | 11.8 | 3.7 | 10.8 |
| | External appearance | | Presence or absence of change | A | B | A | D | C |
| | Production stability | | | A | B | A | B | C |

As shown in Table 1, in the resin composition of each Example, the viscosity at 260° C. obtainable when the shear rate was 243.2 [1/sec] was set to be equal to or more than 400 Pa·s and equal to or less than 3500 Pa·s, and as a result, the base material layer 1 formed by using such a resin composition could be molded such that practically no change in the external appearance was recognized.

In contrast, in the resin composition of each Comparative Example, the viscosity at 260° C. obtainable when the shear rate was 243.2 [1/sec] could not be set to be equal to or more than 400 Pa·s and equal to or less than 3500 Pa·s, and due to this, the base material layer 1 formed by using such a resin composition showed the result of being molded such that a clear change in the external appearance was recognized.

INDUSTRIAL APPLICABILITY

The resin composition of the present invention contains a polycarbonate-based resin and a visible light absorber, and the visible light absorber includes a plurality of kinds of light absorbers. Among the light absorbers, the contents of which in this resin composition are each equal to or more than 0.005 wt %, when a light absorber having the lowest melting point is denoted as a first light absorber, and a light absorber having the highest melting point is denoted as a second light absorber, the melting point of the first light absorber is equal to or higher than 200° C., and the melting point of the second light absorber is equal to or lower than 330° C. Furthermore, the viscosity at 260° C. of the resin composition obtainable when the shear rate is 243 [1/sec] is equal to or more than 400 Pa·s and equal to or less than 3500 Pa·s. Therefore, even if the first light absorber and the second light absorber having melting points such as described above, that is, visible light absorbers having high melting points, are included as visible light absorbers in the resin composition, these visible light absorbers can be dissolved and dispersed in the resin composition with excellent solubility and dispersibility. Therefore, a first layer to be included in the optical layer as a cover member, and a molded body, the first layer and the molded body having been formed by using such a resin composition, can have excellent external appearance. Furthermore, an optical layer and a cover member provided with such a first layer can also have an excellent external appearance, and moreover, a moving body provided with such an optical layer can have excellent reliability. Therefore, the present invention is industrially applicable.

REFERENCE SIGNS LIST

1 Base material layer
2 Protective layer
3 Visible light absorbing layer
4 Ultraviolet absorbing layer
10, 10A Optical layer

The invention claimed is:

1. A resin composition used for forming a first layer of an optical layer, the first layer including a polycarbonate-based resin as a main material and a visible light absorber for absorbing visible light, and the resin composition comprising the polycarbonate-based resin and the visible light absorber, wherein when a weight-average molecular weight of the polycarbonate-based resin is denoted by Mw and a number-average molecular weight of the polycarbonate-based resin is denoted by Mn, Mw/Mn is equal to or more than 1.0 and equal to or less than 2.0, and/or the weight-average molecular weight Mw is equal to or more than $1.2 \times 10^4$ and equal to or less than $3.5 \times 10^4$, wherein the visible light absorber includes a plurality of kinds of light absorbers so as to block the visible light and allow transmission of near-infrared light, wherein among the light absorbers, each of which has a content of equal to or more than 0.005 wt % in the resin composition, when a light absorber having a lowest melting point is denoted as a first light absorber and a light absorber having a highest melting point is denoted as a second light absorber, the melting point of the first light absorber is equal to or higher than 200° C., and equal to or lower than 330° C., and the melting point of the second light absorber is equal to or higher than 280° C. and equal to or lower than 330° C., wherein the second light absorber absorbs light in a wavelength range of equal to or more than 680 nm and equal to or less than 800 nm, and wherein when a shear rate for the resin composition is 243.2 1/sec, a viscosity at 260° C. of the resin composition is equal to or more than 600 Pa·s and equal to or less than 3500 Pa·s.

2. The resin composition according to claim 1, wherein when a viscosity of the resin composition measured at a shear rate of 12.16 1/sec at 260° C. is denoted by $\eta 1$, and a viscosity measured at a shear rate of 2432 1/sec at 260° C. is denoted by $\eta 5$, the resin composition has a thixotropic index, which is a viscosity ratio ($\eta 1/\eta 5$), of equal to or more than 5.0 and equal to or less than 15.0.

3. The resin composition according to claim 1, wherein a content of the first light absorber in the resin composition is equal to or more than 0.005 wt % and equal to or less than 0.200 wt %.

4. The resin composition according to claim 1, wherein the first light absorber absorbs light in a wavelength range of equal to or more than 360 nm and equal to or less than 500 nm.

5. The resin composition according to claim 1, wherein a content of the second light absorber in the resin composition is equal to or more than 0.005 wt % and equal to or less than 0.200 wt %.

6. The resin composition according to claim 1, wherein the visible light absorber further contains a third light absorber for absorbing light in a wavelength range of equal to or more than 450 nm and equal to or less than 580 nm, a fourth light absorber for absorbing light in a wavelength range of equal to or more than 500 nm and equal to or less than 660 nm, and a fifth light absorber for absorbing light in a wavelength range of equal to or more than 600 nm and equal to or less than 720 nm, each of which has a melting point of equal to or higher than the lowest melting point and equal to or lower than the highest melting point.

7. A molded body used for forming the first layer, the molded body being molded using the resin composition according to claim 1.

8. An optical layer comprising the first layer formed by using the molded body according to claim 7.

9. An optical layer comprising the first layer formed by using the resin composition according to claim 1.

10. The optical layer according to claim 9, wherein the optical layer further comprises a second layer that protects the first layer.

11. The optical layer according to claim 9, wherein the optical layer is used as a cover member having a light-transmitting property to block visible light and allow transmission of near-infrared light.

12. A cover member provided on a moving body and having a light-transmitting property to block visible light and allow transmission of near-infrared light, wherein the cover member comprises the optical layer according to claim 9.

13. A moving body comprising the cover member according to claim 12.

14. The resin composition according to claim 1, wherein the melting point of the first light absorber is equal to or higher than 240° C. and equal to or lower than 320° C., and the melting point of the second light absorber is equal to or higher than 280° C. and equal to or lower than 320° C., and wherein when the shear rate for the resin composition is 243.2 1/sec, the viscosity at 260° C. of the resin composition is equal to or more than 600 Pa·s and equal to or less than 3000 Pa·s.

* * * * *